United States Patent [19]

Folsom

[11] Patent Number: 5,312,858
[45] Date of Patent: May 17, 1994

[54] CONSTRUCTION ARTICLE FROM WASTE MATERIALS AND METHOD OF MAKING THE SAME

[76] Inventor: Virgil Folsom, 2324 W. Mount Vernon, Springfield, Mo. 65802

[21] Appl. No.: 78,488

[22] Filed: Jun. 21, 1993

Related U.S. Application Data

[63] Continuation of Ser. No. 807,208, Dec. 16, 1991, abandoned.

[51] Int. Cl.⁵ .......................... C08K 3/10; C08K 11/00
[52] U.S. Cl. .................................. 524/435; 524/494; 523/129; 106/697
[58] Field of Search ............. 523/129; 524/11, 34, 524/35, 431, 437, 497, 494, 434, 435, 436; 106/697

[56] References Cited

U.S. PATENT DOCUMENTS

| | | | |
|---|---|---|---|
| 3,846,366 | 11/1974 | Wallace | 524/437 |
| 4,866,110 | 9/1990 | Lee | 524/11 |

FOREIGN PATENT DOCUMENTS

| | | | |
|---|---|---|---|
| 0256663 | 2/1988 | European Pat. Off. | 524/11 |
| 9000184 | 1/1990 | PCT Int'l Appl. | 524/11 |

*Primary Examiner*—Paul R. Michl
*Assistant Examiner*—LaVonda DeWitt
*Attorney, Agent, or Firm*—Hovey, Williams, Timmons & Collins

[57] ABSTRACT

A construction article manufactured from recycled waste materials is provided which efficiently utilizes a variety of ordinary refuse materials in providing a high-strength article. The article may be constructed of either ash as well as unburnt material filler and tack combined with a plastic binder, or alternatively metal, glass, paper and cloth may constitute the filler to be combined with the plastic binder. The plastic binder may be of a variety of polymers which may be melted to fuse the waste material together. The article is preferably provided with complimentary recesses and projections on opposite sides whereby similar articles may be combined to interlock with one another and bonded by the use of an organic solvent.

18 Claims, 1 Drawing Sheet

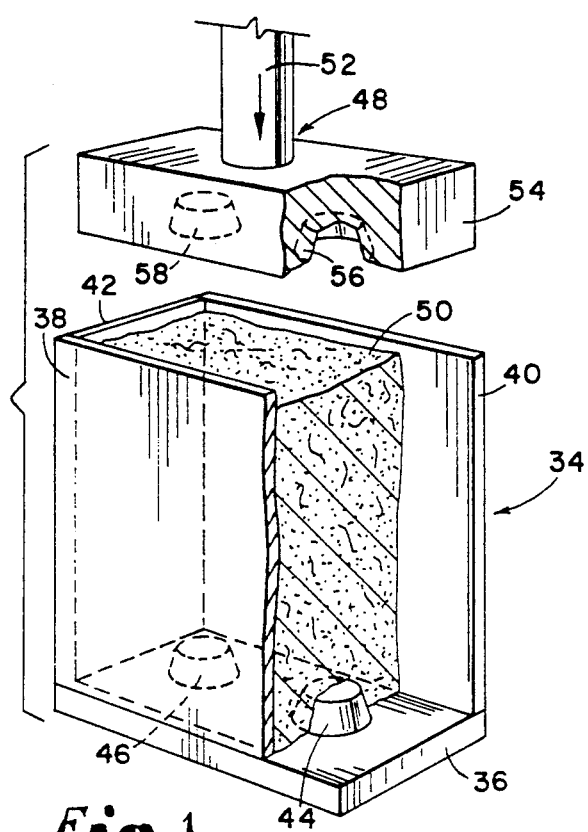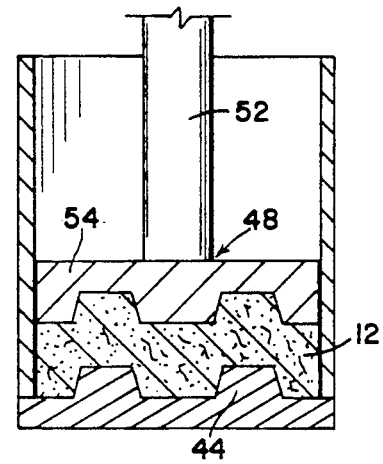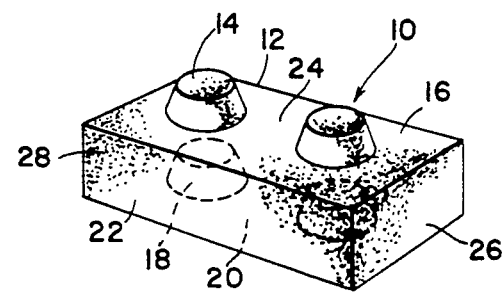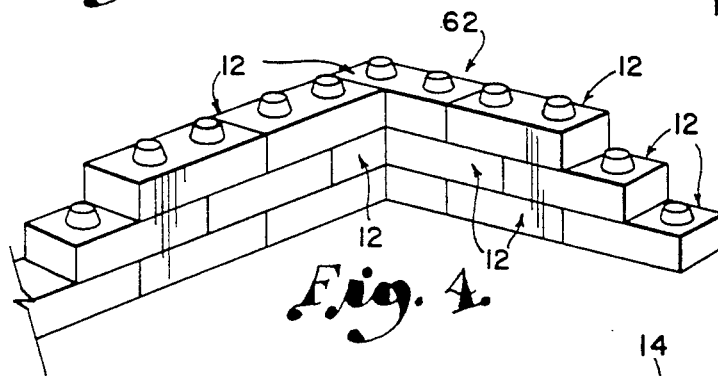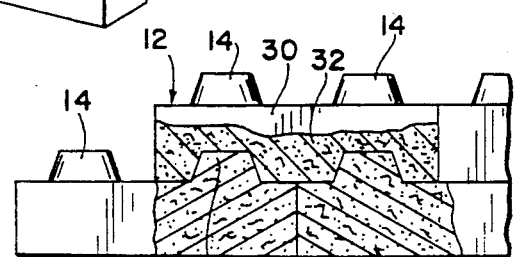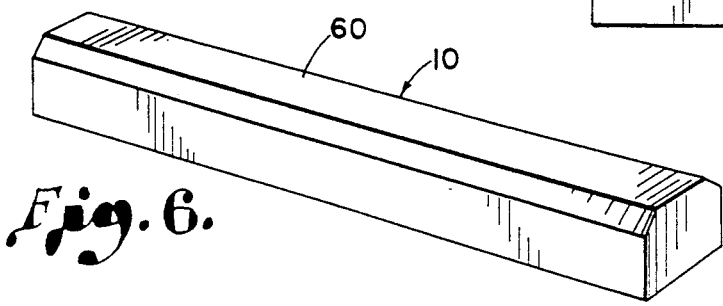

CONSTRUCTION ARTICLE FROM WASTE MATERIALS AND METHOD OF MAKING THE SAME

This application is a continuation of application Ser. No. 07/807,208, filed Dec. 16, 1991 now abandoned.

BACKGROUND OF THE INVENTION

1. Field of the Invention

An improved construction article of a combination of recycled waste materials is provided which is strong, resistant to decomposition and may be combined in interlocking relationship with other similarly configured articles. In particular, the invention hereof advantageously utilizes materials such as plastic, metal, paper, polystyrene foam, and glass which have long decomposition periods and the invention thus provides a means for converting what would otherwise be solid waste into a useable article.

2. Description of the Prior Art

The solid waste problem encountered throughout the world is well-known. The conventional solution to the disposal of solid wastes is the landfill, which effectively contaminates the soil against future use and makes the surrounding area undesirable for habitation. Several solutions have been proposed for eliminating or reducing the solid waste which is deposited in landfills. One proposed solution is the use of solid waste as fuel, thereby reducing its volume and generating energy as a by-product of waste disposal.

Unfortunately, a number of types of solid waste are not effectively dealt with by ordinary combustion processes. Glass, metal, and many plastics prove unsatisfactory fuels and yield residues which still must be disposed. Also, combustion of waste materials requires an intensive capital investment and must be accompanied by satisfactory environmental controls to prevent discharge of combustion byproducts to the atmosphere. As a result, landfills remain the most common solid waste disposal method.

These materials represent some of the common constituents of what is regarded as "municipal solid waste". Municipal solid waste (MSW) has been defined by the Environmental Protection Agency as including "wastes such as durable goods, nondurable goods, containers and packaging, food wastes, yard wastes, and miscellaneous inorganic wastes from residential, commercial, institutional and industrial sources." Examples of wastes from these categories include appliances, newspapers, clothing, food scraps, boxes, disposable tableware, office and classroom paper, wood pallets and cafeteria wastes. MSW does not include wastes from other sources, such as municipal sludges, combustion ash, and industrial non-hazardous processed wastes that might also be disposed of in municipal waste landfills or incinerators. According to 1988 nationwide figures, MSW includes the following constituents by weight:

| Constituent | Percent | Tons in Millions |
| --- | --- | --- |
| Paper | 40% | 71.8 |
| Yard Wastes | 17.6% | 31.6 |
| Metals | 8.5% | 15.3 |
| Glass | 7.0% | 12.5 |
| Plastics | 8.0% | 14.4 |
| Other | 11.6% | 20.8 |
| Food Wastes | 7.4% | 13.2 |

A separate problem encountered by contractors has been the need for a low-cost construction article which can be used in low-stress environments. Contractors most often purchase new materials made of concrete for retaining walls, parking lot stops, and other applications where lesser materials than brick, cement or concrete would often suffice. These new materials are often relatively costly and require additional quarries for obtaining the raw materials.

There has thus developed a need for a low-cost, relatively high-strength material which could be used in construction environments. There has additionally developed a need for alternatives to landfill disposal of solid wastes.

SUMMARY OF THE INVENTION

These needs are largely met by the construction article in accordance with the present invention. That is to say, the article in accordance with the present invention is self-sustaining, durable, economical to manufacture, and easy to combine into a composite structure. It advantageously utilizes recycled waste materials which are inexpensive or even profitable to obtain and are easily separable in accordance with conventional recycling methods, as well as using those materials which may be undesirable as a fuel.

In greater detail, the present invention involves a construction article which may assume a variety of different external shapes as the circumstances of use dictate. The article may be in the form of an interlocking block or alternatively may be provided as an elongated bar which may be useful as a parking stop. The article may be formed in a press or extruded of a combination of recycled waste materials (of course, more expensive virgin materials could be substituted). In one embodiment, these materials may include a plastic binder and a filler of glass, scrap metal, paper, wood chips and cloth, and other non-food item MSW, while in another embodiment, the materials may include a plastic binder and a filler of ash (including unburnt quantities of metal and glass), and tack, as well as additional quantities of unburnt material such as paper, leather and rags. The resulting article is especially easy to bond with other similar articles by use of a solvent for synthetic resins such as methyl ethyl ketone (MEK) to yield an integral structure.

In an alternative embodiment, portland cement is substituted for plastic as a binder component to hold the waste materials together.

The invention hereof also includes a method of making the article which involves grinding or otherwise comminuting the component materials into a suitable size, combining the comminuted materials, heating the combined materials to a temperature sufficient to melt the plastic, compressing the materials, and allowing the article to cool to an ambient temperature. The component materials are preferably heated to a temperature of 400° to 600° F. and compressed under pressure ranging in excess of 300 pounds per square inch. The resulting article is solid, structurally sound, and easy to bond to other articles by using an organic solvent such as a low molecular weight ketone.

BRIEF DESCRIPTION OF THE DRAWINGS

FIG. 1 is a perspective view in partial section of a mold and press prior to compressing recycled waste material to produce an article of interlocking block configuration in accordance with the invention hereof;

FIG. 2 is a front vertical cross-sectional view of the mold and press used in producing the article shown in FIG. 1 after compressing recycled waste material in accordance with the present invention;

FIG. 3 is a perspective view of the block resulting from the processes shown in FIGS. 1 and 2 with recesses shown in phantom of the article of the present invention;

FIG. 4 is a perspective view of a partially completed wall constructed of block articles of the present invention;

FIG. 5 is a front elevational view in partial cross-section showing the wall of FIG. 4 under construction comprising articles in accordance with the present invention; and FIG. 6 is a perspective view of an alternate embodiment of the article of the present invention formed into a parking abutment.

DESCRIPTION OF THE PREFERRED EMBODIMENT

Referring now to the drawing a construction article 10 in accordance with the present invention is shown in FIG. 3 in a completed, unitary, self-sustaining form. The article 10 broadly includes a block 12 presenting a substantially rectilinear shape which is provided with a pair of spaced-apart frustoconical bosses 14 on the top wall 16 and a pair of complimentarily configured, similarly spaced-apart recesses 18 defined in the bottom wall 20. The block 12 preferably has a pair of opposed, upright end walls 22 and 24 and a pair of parallel, upright, opposed side walls 26 and 28 in perpendicular orientation to the end walls 22 and 24. Each block 12 is thus adapted to interfit with a similarly configured block 12 in registry therewith or in staggered relationship wherein the bosses 14 mate with the recesses 18 of adjacent blocks, or alternatively to lie in butment with any other rectilinear member, as shown in FIG. 4.

In greater detail, block 12 may be provided with a substantially water-impervious outer coating 30 over a composite core 32. Coating 30 may be, for example, latex paint, or alternatively the core 32 may be covered with a thermoplastic coating to substantially encase the core 32 therewithin. However, in many instances it may be advisable, for purposes as explained herein below, to apply coating 30 only after the blocks 12 have been welded together with an organic solvent such as methyl ethyl ketone (MEK), acetone or a similar low molecular weight ketone.

The core 32 preferably comprises recycled MSW materials 50 comprising a binder and a filler, although it may be readily apparent that virgin materials may be substituted at greater costs. In one embodiment of the present invention, such waste materials include synthetic resin, glass metal, paper and cloth. Virtually all synthetic resins used in commercially sold articles can be used as the binder. Exemplary of the synthetic resin and their everyday applications is the following list:

| Plastics | Everyday Applications |
| --- | --- |
| ABS (Acrylonitaile-Butadiene-Styrene) | Telephones, business machine housings, power tool housings, pipe and fittings |
| Acetal | Combs, butane lighter bodies, (Bic) ball point pen barrels, soap dispensers, garden hose nozzles |
| Acrylic | Skylights, commercial signs, auto taillights, sunglass lenses, bank security barriers |
| EVA (Ethylene-Vinyl Acetate) | Produce bags, pet food pouches, dry soup bags, auto bumper pads, swimming pool hose |
| HDPE (High Density Polyethylene) | Milk and soft drink crates, caps, pipes & profiles, grocery bags, 55-gallon drums, gasoline tanks, toys, and detergent bottles |
| LDPE (Low Density Polyethylene) | Bread packaging, frozen food bags, toys, paint can lids, milk bottle caps |
| LLDPE (Linear Low Density Polyethylene) | Film, piping, wire and cable insulation, trash can liners, dry cleaning garment bags |
| Nylon | Hair brushes, chain saw housing, bicycle wheels, fish line, auto engine fans, ice skate supports, frozen food pouches |
| PB (Polybutylene) | Hot and cold water pipe, fire sprinkler piping, food and meat packaging films, hot fill containers (Thermos). |
| PBT (Polybutylene Terephthalate) | Steam iron handles, hair dryer housings, oven handles and switches, LED displays, lamp sockets |
| PET (Polyethylene Terephthalate) | Beverage bottles (2-liter soda), mouthwash jars, peanut butter jars, wine bottles, salad dressing bottles |
| Polycarbonate | Compact disks, auto head lamps, 5-gallon water bottles, baby formula bottles, traffic light signal lenses, unbreakable beverage glasses |
| Polyester or LCP (Liquid Crystal Polymers) | Chemical pumps, electronic components, coil bobbins, electrical sockets, dual ovenable cookware (Tupperware) |
| PP (Polypropylene) | Batter cases, trim and air ducts in automobiles, yogurt and margarine tubs, medicine bottles, yarns used in fabrics in luggage and shoes, upholstery and car seats |
| PS (Polystyrene) | Video cassettes, audio/visual equipment, TV's, cabinet doors, packaging for compact disks, vials, egg cartons, packages for fast food items |
| Polyurethane | Insulation and foam padding |
| PVC (Polyvinyl Chloride) | Heavy-walled pressure pipe, surgical gloves, crystal clear food packaging, house siding, garbage disposals, skylight frames |
| PVDC (Polyvinylidene Dichloride) | Saran films, cosmetic packaging, unit dose packaging of pharmaceuticals, meat, cheese and poultry packaging |

Virtually any kind of glass and metal may be used in the composite core 32 hereof as a filler. Because the materials must first be cut, ground or broken prior to molding into the block 12, it has been found that small metal objects such as tin cans, metal toys, household aluminum articles and other small items made of aluminum, brass, steel and tin are most advantageously employed, while larger metal components are more economically utilized in other recycling efforts requiring less comminution thereof. Thus, the block in accordance with the present invention advantageously compliments other recycling efforts by using less desirable metal components.

Paper and cloth also comprise constituents of the filler of one of the preferred compositions of the waste material 50 used in making the core 32 of the block 12 in accordance with the present invention. The composition and type of paper employed is not critical, and the cloth may be selected from any of a variety of textile materials such as cotton rags, discarded garments of wool, nylon, or other synthetic resin material, or other natural or synthetic fibers. In addition, other non-food item derived MSW (e.g., non-garbage materials) such as leather and wood may be used in the filler.

A first preferred embodiment "A" of the present invention includes waste material 50 introduced into the mold 34 which is preferably derived from MSW and includes about 30 to 90% synthetic resin binder by volume, otherwise measured as about 40 to about 90% synthetic resin by weight. By including synthetic resin in this constituent amount, the block 12 is satisfactorily held together when the synthetic resin is melted, has sufficient strength to withstand normal compression loads, and will readily bond to other similarly constructed blocks 12 by chemical welding upon the application of MEK or other organic solvents to the surfaces lying in contact with one another. In particularly preferred embodiments, the total synthetic resin constituent comprises about 43% of the waste material 50 by weight. The filler includes a glass constituent which is about 18% of the waste material 50 by weight. The remaining portions of the binder include scrap metal of about 18% by weight of the total waste material. Paper comprises about 7% of the waste material 50 by weight and wood chips comprise about 5% of the waste material 50 by weight, comprising a total cellulosic constituent of about 12% by weight. Rags or other textile material is present in the waste material 50 at about 8% by weight. Preferably, no garbage or heavy metals are used in the waste material 50 hereof, heavy metals being understood as being metal objects which are massive and require substantial energy expenditures to reduce in size as well as metals which constitute hazardous waste such as Hg.

An alternative preferred embodiment "B", of the present invention includes incinerated wastes in the filler of the waste material 50 which is preferably also derived from MSW. A construction article made from waste material 50 which includes incinerated items requires the addition of "tack" in order to hold a construction article in a self-sustaining form upon the application of heat and pressure. In this application, "tack" should be understood to include a mixture of equal parts of crude oil and water, and has been obtained from Kearney La Comp of Springfield, Mo. In this embodiment, "tack" constitutes approximately 7.5% of the overall constituent material, paper constitutes approximately 6.6% and wood ashes 4.7%, steel chips and glass each constitute about 17%, rags and other textile materials constitute about 7.5% of the material, and the synthetic resin binder constitutes the remainder, or about 40% of the overall mixture by weight. In another method of making the composition of the "B" embodiment, three parts of ashes (inclusive of glass, metal, rags and other material), by volume, were combined with one part tack by volume and five parts of plastic by volume to yield the desired core composition.

In one particularly preferred embodiment of the first composition "A", the constituents of the material comprised about 15 parts synthetic resin (other than polystyrene foam) by volume, about 1 part glass by volume, about 1 part steel by volume, about 5 parts polystyrene foam by volume, about 5 parts paper by volume, about 0.8 parts wood by volume and about 5 parts cotton rags by volume. A block having overall dimensions of approximately 4" width, 2" height and 8" length with corresponding lugs and recesses for resisting lateral separation when connected was made of these constituents in accordance with the method described below and had a moisture absorbency of less than 1% by weight under the Spalling test, and a coated block had a moisture absorbency of 0.47% by weight. By coated, it is meant that the brick was painted with a latex paint. As used in this application, moisture absorbency is determined under the Spalling Test, which involves submerging the blocks about 1" in water and allowing the blocks to stand for 24 hours. The blocks were next placed in a freezer at −10° Celsius for a period of 24 hours, and then allowed to dry for 24 hours at about 20° Celsius. This cycle is repeated five times and the weight of the blocks before and after the test are compared to determine moisture absorbency.

Additional testing of blocks in accordance with the present invention yielded additional test results indicative of the physical properties of the construction article hereof. Blocks of the "A" embodiment were tested for specific gravity and determined to have specific gravity values averaging 1.222. In addition, compression testing of the three "A" blocks at a load of 1,560 pounds per square inch revealed percent compressions of 7.4, 17.6 and 9.7.

Further testing of blocks in accordance with the "A" embodiment of the construction article of the present invention was conducted to determine their thermal resistance factor, commonly known as the "R" factor. This testing consisted of comparing the results of temperature variations for blocks having different percentage weights of synthetic resins as compared to a known standard, in this case, glass fiber insulation having a known R factor of approximately 12.5. In this test, an enclosed box was constructed and placed in an ambient temperature environment with one side of the box maintained at a temperature of approximately 160° Fahrenheit. After 24 hours of exposure to this temperature, the warm side of the box read 162° while the cold side revealed a high of 112°, a 50° difference. The same test was conducted on 4" thick construction article blocks of the "A" embodiment having varying amounts of synthetic resin. The following results were obtained:

| Composition | ΔT | R factor (per inch thickness) |
| --- | --- | --- |
| 30% synthetic resin | 34 | 1.5 |
| 40% synthetic resin | 40 | 2.5 |
| 50% synthetic resin | 28 | 1.75 |
| 60% synthetic resin | 34 | 1.5 |
| 70% synthetic resin | 30 | 1.9 |
| 80% synthetic resin | 36 | 2.25 |
| 90% synthetic resin | 32 | 2.0 |

Similarly, the same blocks were tested for tensile strength, shock resistance and Durometer values. Tensile strength, as used in this application, was determined by sectioning a block 12 into four equally sized slices and pulling the slices apart. Durometer values were determined by using a "D"ASTM D2240 Model 307L 409, conventionally used for hard rubber and plastics. The Durometer was supplied by Pacific Transducer Corporation—PTC Instruments. Shock resistance was determined by sectioning a block 12 into four test coupons, each measuring 1" by 0.75" by 3". The test coupons were individually mounted in a Charpy/Izod impact tester. Shock resistance values, as defined and used in this application, constitute the force in foot pounds necessary to shear a coupon of the above size in the Charpy/Izod impact tester. Results of these tests are as follows:

| TENSILE STRENGTH | | | | | | |
|---|---|---|---|---|---|---|
| Composition | Spec. #1 | Spec. #2 | Spec. #3 | Spec. #4 | Mean | Std. Deviat. |
| 30% plastic | 791 | 699 | 578 | 840 | 727 | 100 |
| 40% plastic | 528 | 449 | 590 | 346 | 478 | 91 |
| 50% plastic | 1341 | 801 | 668 | 1197 | 1002 | 276 |
| 60% plastic | 593 | 1069 | 846 | 934 | 861 | 174 |
| 70% plastic | 1280 | 1410 | 743 | 740 | 1043 | 305 |
| 80% plastic | 1748 | 1059 | 1544 | 744 | 1274 | 395 |
| 90% plastic | 886 | 1120 | 571 | 1125 | 926 | 226 |

| SHOCK RESISTANCE (FOOT-POUNDS TO SHEAR) | | | | | | |
|---|---|---|---|---|---|---|
| Composition | Spec. #1 | Spec. #2 | Spec. #3 | Spec. #4 | Mean | Std. Deviat. |
| 30% plastic | 12 | 15 | 10 | 13 | 13 | 2 |
| 40% plastic | 10 | 11 | 11 | 14 | 12 | 2 |
| 50% plastic | 7 | 13 | 16 | 5 | 10 | 4 |
| 60% plastic | 7 | 14 | 9 | 16 | 12 | 4 |
| 70% plastic | 20 | 22 | 28 | 11 | 20 | 6 |
| 80% plastic | 28 | 27 | 28 | 25 | 27 | 1 |
| 90% plastic | 13 | 20 | 30 | 25 | 22 | 6 |

| DUROMETER TEST RESULTS | | | |
|---|---|---|---|
| Composition | Spec. #1 | Spec. #2 | Mean |
| 30% plastic | 59 | 68 | 63.5 |
| 40% plastic | 53 | 67 | 60 |
| 50% plastic | 65 | 68 | 66.5 |
| 60% plastic | 62 | 68 | 65 |
| 70% plastic | 58 | 67 | 62.5 |
| 80% plastic | 60 | 65 | 62.5 |
| 90% plastic | 65 | 69 | 67 |

In a third "C" composition in accordance with the present invention, portland cement is substituted for plastic to bond the waste components together. The third embodiment includes quantities of glass, metal, cloth and paper. In one sample block 12 prepared in accordance with the "C" embodiment, portland cement comprises about 42.5% of the mixture by weight, glass about 8% by weight, rags or other cloth about 4% by weight, steel about 8% by weight, aluminum about 1.5% by weight, and wood chips about 3.5% by weight. The comminuted components are mixed together with about 32.5% water, and thoroughly intermixed. The resulting mixture is placed into a mold with sufficient quantities of the composition comprising the core composition to be compressed to at least ½ and preferably about ¼ of the original volume. Thus, when a 2" high block is ultimately desired, about an 8" thick deposit of the "C" composition is placed into the mold. It has been found that about 10,000 pounds of pressure is sufficient for a block 12 measuring about 2" high, 4" wide, and 7⅝" long. The resulting block is then allowed to dry or cure. The resulting block has a specific gravity averaging about 1.7, and a compressive strength of about 2.5 to 8.0% compression at a load of 1560 pounds per square inch.

In manufacturing the block 12, it has been found useful to crush, grind, break or otherwise comminute each of the components to a size no greater than ¾", and preferably about ¼". That is to say, the recycled waste material should preferably have no dimension greater than ¾" and, more preferably, ¼". The constituent materials are then mixed to provide a uniform dispersion of the components throughout the mixture and then placed in a mold 34 as shown in FIG. 1. The mold as used herein is provided with a base 36, front wall 38, rear wall 40 and a pair of opposed, enclosing connecting walls 42 all extending upwardly from base 36. Base 36 additionally includes a pair of forms 44 and 46 as shown in FIG. 1 to define the recesses 18 and the block 12. A press 48 is used on compress the combined recycled waste material 50 and includes a shaft 52 and a head 54 defining two cavities 56 and 58 on the bottom surface thereof corresponding in size to projections 14. The shaft 52 is typically connected to a force-applied means, such as a hydraulic jack or ram to compress the material 50 within the mold 34.

In accordance with the method of the present invention, the waste material 50 of each of the core compositions "A", "B" and "C" is first comminuted to a desired size and then combined in the selected amounts to yield a desired based composition. The mixed waste material 50 is then deposited into the mold 34. In making a block 12 that will have the final dimensions of about 4" wide by 7⅝" long with 2" high end walls and side walls, it has been found that waste material about 8" in height must be added to the mold 34. Thus, the mixture is compressed to at least ½ and preferably to about ¼ of its original volume.

In making the "A" and "B" embodiments of the article 10 of the present invention, mold 34 and material therein are then heated to between 400° and 600° F. It has been found that temperatures substantially below about 400° fail to adequately melt the plastic within the waste materials 50, while temperatures substantially in excess of about 600° overheat the plastic and cause it to change to an unusable residue. After the waste material 50 has been sufficiently heated, the mold 34 is removed from the furnace or other heating means and placed below press 48. It has been found that the application of about 300 to 500 pounds per square inch compresses the waste material 50 to about ¼ its original volume as shown in FIG. 2. The resulting block 12 is sufficiently strong, stable and uniform that after retraction of shaft 52 to lift head 54 off of block 12, the block 12 will retain its shape. Cooling of the block to ambient temperature may take place with the press 48 in position or alternatively with the press removed. Thereafter, a coating 30 may be applied to the block as shown in FIG. 5, or alternatively the block may remain uncoated as shown in FIG. 3 for bonding to other blocks.

In an alternative embodiment of the construction article 10 of the present invention, the article may be formed into a bar 60 or other shapes as desired. For example, bar 60 is especially useful as a parking barrier, but might be used in other applications of construction. In addition, the bar 60 may be manufactured by extrusion rather than molding as described above, whereby the waste materials 50 could be introduced into the inlet of an extruder and force outwardly through a die to yield a satisfactory construction article 10 as shown in FIG. 6.

The block 12 of the present invention might be used, for example, to build a wall 62 as shown in FIGS. 4 and 5. For example, the initial course of blocks 12 might rest on the earth or other foundation surface and then bonded to a next course of blocks 12 by applying, in the case of embodiments "A" and "B" which include a synthetic resin constituent, MEK to the mating top wall and bottom wall of superimposed blocks 12. In addition, MEK has been found to be a useful solvent to bond side walls 26 and 28 of adjacent blocks 12 to connect the blocks into an integral wall 62, or to bond bosses 14 to recesses 18 or to connect any other surfaces of adjacent blocks 12 of the "A" and "B" embodiments hereof.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A construction article comprising of self-sustaining body including at least about 30% by weight synthetic resin binder intermixed with filler comprising unburnt comminuted waste derived from MSW and having an average maximum dimension of up to about ¾", said MSW-derived filler including respective quantities of unburnt glass and metals, said article being formed by mixing said binder in a solid form with said filler, simultaneously subjecting the mixture to a temperature of from about 400°-600° F. and compression of at least about 300 psi to liquefy said binder and cause intimate mixing thereof with the filler to form said body, and allowing the body to cool.

2. A construction article as claimed in claim 1, said binder being selected from the group of synthetic resins comprising acrylonitaile butadiene styrene, acetal, acrylic, ethylene vinyl acetate, high density polyethylene, low density polyethylene, linear low density polyethylene, nylon, polybutylene, polybutylene terephthalate, polyethylene terephthalate, polycarbonate, polyester, polypropylene, polystyrene, polyurethane, polyvinyl chloride, and polyvinylidene chloride.

3. A construction article as claimed in claim 1, wherein said filler derived from unburnt comminuted municipal solid water further comprises ash, leather, rubber and textiles, but exclusive of garbage.

4. A construction article as claimed in claim 1, said body further including a quantity of tack consisting essentially of crude oil and water.

5. A construction article as claimed in claim 1, wherein said filler comprises from about 40 to 65% of said body by weight, said filler derived from MSW further comprising textiles and cellulosic material.

6. A construction article as claimed in claim 1, wherein said intermixed resin and binder is subjected to compression sufficient to reduce the volume of said intermixture to about 25% of the original, uncompressed volume.

7. A construction article as claimed in claim 1, wherein said article is formed by placing said intermixed binder and filler in a mold, heating said mold sufficient to melt said binder, and pressing said material in said mold.

8. A construction article as claimed in claim 1, wherein said article is formed by extrusion.

9. A construction article as claimed in claim 1, wherein said article is comminuted so that no constituent of said binder or filler presents a maximum dimension in excess of ¼".

10. A construction article as claimed in claim 1, wherein said article presents opposing and second surfaces, said surfaces respectively presenting cooperatively configured bosses and recesses whereby similarly constructed articles may be engaged to resist surface to surface movement therebetween.

11. A construction article as claimed in claim 1, wherein said article may be adhered to a second such article by an organic solvent.

12. A construction article as claimed in claim 1, wherein said synthetic resin binder is waste-derived.

13. A construction article as claimed in claim 1, wherein said article has a compression strength value of at least 25%.

14. A construction article as claimed in claim 1, wherein said article has a Durometer hardness of at least 50.

15. A construction article as claimed in claim 1, wherein said article has a mean tensile strength value of at least 300 pounds per square inch.

16. A construction article as claimed in claim 1, wherein said article has a thermal insulative factor in excess of about 2.2.

17. A construction article as claimed in claim 1, wherein said article has a moisture absorption value of less than about 1% by weight.

18. A construction article as claimed in claim 1, wherein said article has a mean shock resistance value of at least five foot-pounds.

* * * * *